(12) United States Patent
Johnson

(10) Patent No.: US 6,502,730 B2
(45) Date of Patent: Jan. 7, 2003

(54) CARRIER RACK FOR VEHICLE

(76) Inventor: Danny R. Johnson, 7908 W. 525 North, Boggstown, IN (US) 46110

( * ) Notice: Subject to any disclaimer, the term of this patent is extended or adjusted under 35 U.S.C. 154(b) by 0 days.

(21) Appl. No.: 09/756,341

(22) Filed: Jan. 8, 2001

(65) Prior Publication Data

US 2001/0030216 A1 Oct. 18, 2001

Related U.S. Application Data

(60) Provisional application No. 60/174,651, filed on Jan. 6, 2000.

(51) Int. Cl.$^7$ .................................................. B60R 9/00
(52) U.S. Cl. ........................ 224/519; 224/402; 224/526; 224/529; 224/530; 224/924; 414/462
(58) Field of Search ................................ 224/402, 518, 224/519, 524, 525, 526, 529, 530, 42.32, 538, 924; 414/462

(56) References Cited

U.S. PATENT DOCUMENTS

| | | | | |
|---|---|---|---|---|
| 3,720,333 A | * | 3/1973 | Vaughn | 224/402 X |
| 4,593,840 A | * | 6/1986 | Chown | 224/42.44 X |
| 4,744,590 A | * | 5/1988 | Chesney | 280/769 |
| 4,815,638 A | * | 3/1989 | Hutyra | 224/402 X |
| 4,971,509 A | * | 11/1990 | Sechovec et al. | 414/462 |
| 5,033,662 A | * | 7/1991 | Godin | 296/43 X |
| 5,224,636 A | * | 7/1993 | Bounds | 224/42.44 |
| 5,699,985 A | * | 12/1997 | Vogel | 224/564 |
| 5,996,869 A | * | 12/1999 | Belinky et al. | 224/510 |
| 6,006,973 A | * | 12/1999 | Belinky et al. | 224/510 |
| 6,105,843 A | * | 8/2000 | Dollesin | 224/509 |
| 6,179,184 B1 | * | 1/2001 | Belinky et al. | 224/510 |

* cited by examiner

Primary Examiner—Stephen K. Cronin
(74) Attorney, Agent, or Firm—Woodard, Emhardt, Naughton, Moriarty & McNett LLP

(57) ABSTRACT

A preferred embodiment of the present invention generally comprises a hauling vehicle equipped with a conventional receiving style hitch assembly having a tubular cross member extended along the width of the hauling vehicle and attached to the frame thereof. The tubular cross member includes opposing ends and a centrally located extension tube each having an opening for receiving the mounting hardware of the carrier rack. The carrier rack further comprises a sturdily constructed carrying platform, ramp means for loading the carrying platform, and retractable casters for supporting the carrier rack when not mounted on a hauling vehicle. In addition, the carrier rack preferably has one or more rear safety lights which are communicatively connected to the electrical system of the vehicle via a wiring harness. For the driver to easily locate the rear of the carrier rack via a rear view mirror, a removable tailgate may also be installed.

18 Claims, 15 Drawing Sheets

CARRIER RACK FOR VEHICLE

CROSS-REFERENCE TO RELATED APPLICATIONS

The present application claims priority under 35 U.S.C. §120 from U.S. Provisional Application Ser. No. 60/174,651, filed Jan. 6, 2000.

BACKGROUND OF THE INVENTION

This invention relates in general to carrier racks attachable to a motor vehicle, and more particularly to carrier racks for transporting a heavy load, such as other smaller motorized vehicles, all-terrain vehicles (ATV), and motorcycles, for example.

A variety of carrier racks have been devised for attachment to a vehicle for carrying articles (U.S. Pat. No. 1,367,654, U.S. Pat. No. 4,906,015, U.S. Pat. No. 5,092,503, U.S. Pat. No. 5,427,289, and U.S. Pat. No. 5,586,702). These prior art racks are designed to provide added cargo space, and generally, are quite small and constructed of light weight material, therefore, not suitable for carrying heavy loads. Apart from the size and construction, the single point mounting method employed by the prior art racks (U.S. Pat. No. 4,906,015, U.S. Pat. No. 5,092,503 and U.S. Pat. No. 5,586,702) also makes them unsuitable for carrying a heavy load.

A single point engagement method has two distinct disadvantages. First, the weight of the load is concentrated at one location of the hitch which may cause damage to the hitch assembly, the carrier rack and/or the vehicle. Secondly, there is a tendency for the racks to flex from side to side during turns, when loading, and in high cross wind conditions which causes unstable driving conditions. These disadvantages are more evident when the load is heavy.

Some prior art carrier racks attempt to overcome the above disadvantages with designs which engage the hauling vehicle at multiple locations. U.S. Pat. No. 1,367,654 to Borden disclosed a carrier rack mount via inverted U-shaped bolts to the rear axle of the hauling vehicle at two spaced apart positions. In addition, the carrier is further braced to the upper portion of the vehicle. Such attachment to the rear axle may not be feasible for modem automobiles and the attachment method is also undesirable because the carrier rack cannot be interchangeably mounted to other hauling vehicles. A carrier rack designed for attachment to a conventional hitch would be more desirable.

U.S. Pat. No. 5,427,289 to Ostor disclosed a carrier rack which employs three mounting bars for attachment to a conventional hitch assembly. The center bar is received into the conventional hitch receiver opening and the other two side mounting bars are bolted to the hitch assembly. This attachment method achieves the goal of lessening the side to side movement of the carrier rack during transit, but it is inconvenient to use. For attachment and removal of the rack, an operator has to crawl under the hauling vehicle to unscrew the bolts. In addition, Oster's design unnecessarily weakens the hitch assembly by creating apertures in the hitch assembly to receive the attachment bolts. Furthermore, Oster's rack is not structured to carry a heavy load.

Thus, there is a need for a carrier rack which can be securely and removably mounted to a conventional hitch assembly and which permits easy loading, unloading and transporting of a heavy load. This invention addresses that need.

SUMMARY OF THE INVENTION

The present invention provides a carrier rack for the transportation of heavy loads, such as other motorized vehicles, and has a carrying capacity of approximately 500 lbs., for example.

To attain this, a preferred embodiment of the present invention generally comprises a hauling vehicle equipped with a conventional receiving style hitch assembly having a tubular cross member extended along the width of the hauling vehicle and attached to the frame thereof. The tubular cross member includes opposing ends and a centrally located extension tube each having an opening for receiving the mounting hardware of the carrier rack. The carrier rack further comprises a sturdily constructed carrying platform, ramp means for loading the carrying platform, and retractable casters for supporting the carrier rack when not mounted on a hauling vehicle. In addition, the carrier rack preferably has one or more rear safety lights which are communicatively connected to the electrical system of the vehicle via a wiring harness. For the driver to easily locate the rear of the carrier rack via a rear view mirror, a removable tailgate may also be installed.

It is a principal object herein to provide a carrier rack capable of hauling a heavy load, such as other motorized vehicles.

It is another object herein to provide a carrier rack particularly adapted to be securely and removably mounted onto a conventional hitch assembly at three separate locations for better distributing the weight of the load and reducing the side to side movement of the rack during transit; and to achieve the above goals without modification to the hitch assembly.

It is also another object herein to provide a carrier rack that provides easy access to the carrying platform.

It is a further object herein to provide a carrier rack which is self supporting when not engaged to a vehicle.

These and other objects and advantages of the invention herein will be set forth in the following description made in connection with the accompanying drawings in which like reference characters refer to similar parts throughout the several views.

DESCRIPTION OF THE PREFERRED EMBODIMENTS

For the purposes of promoting an understanding of the principles of the invention, reference will now be made to the embodiments illustrated in the photographs and drawing and specific language will be used to describe the same. It will nevertheless be understood that no limitation of the scope of the invention is thereby intended, such as alterations and further modifications in the illustrated device, and such further applications of the principles of the invention as illustrated therein being contemplated as would normally occur to one skilled in the art to which the invention relates.

Figure 1:
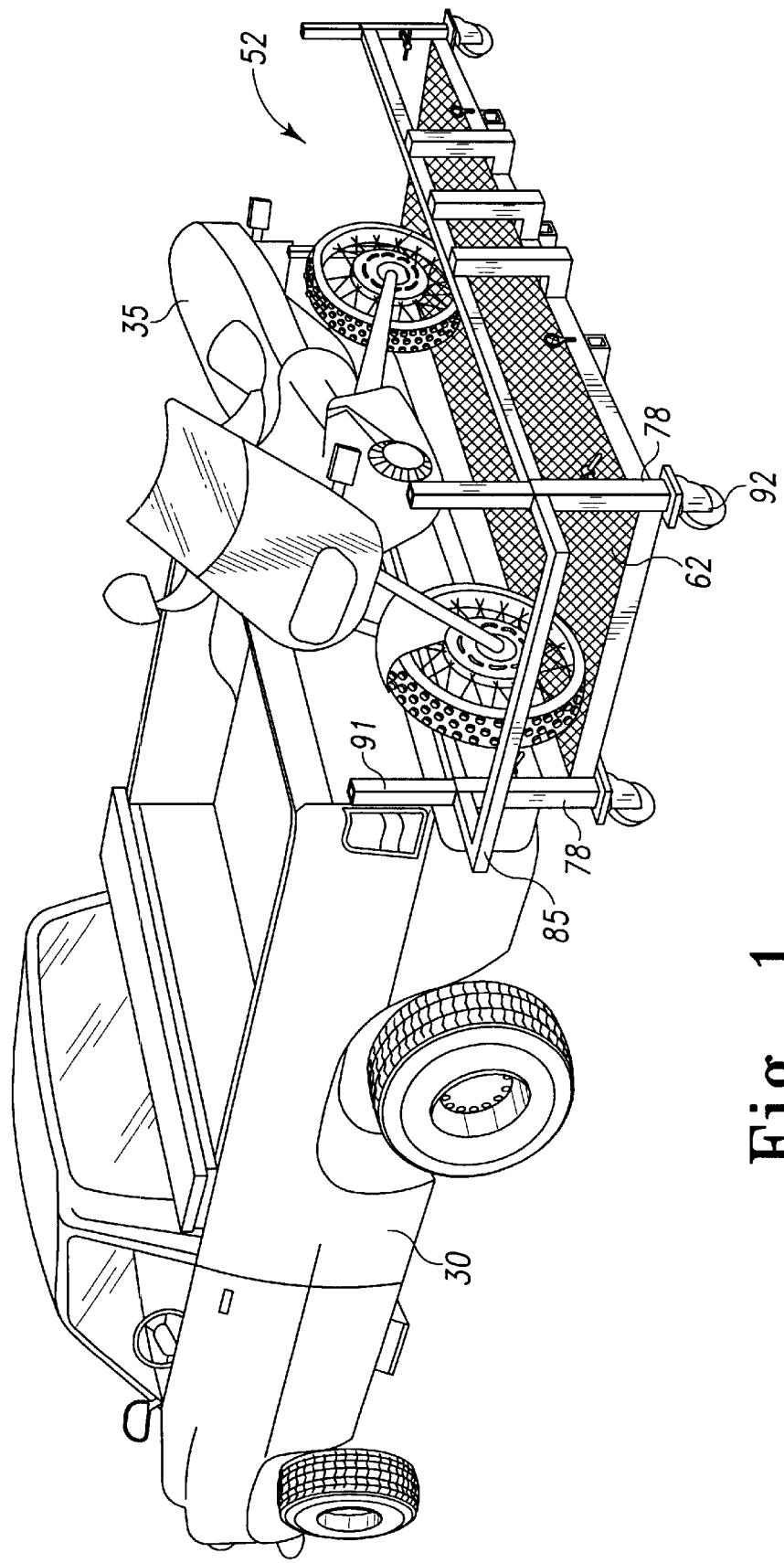
FIG. 1 is a perspective view of an embodiment of the present invention showing a carrier rack attached to a pickup truck and carrying a motorcycle.
Figure 2:
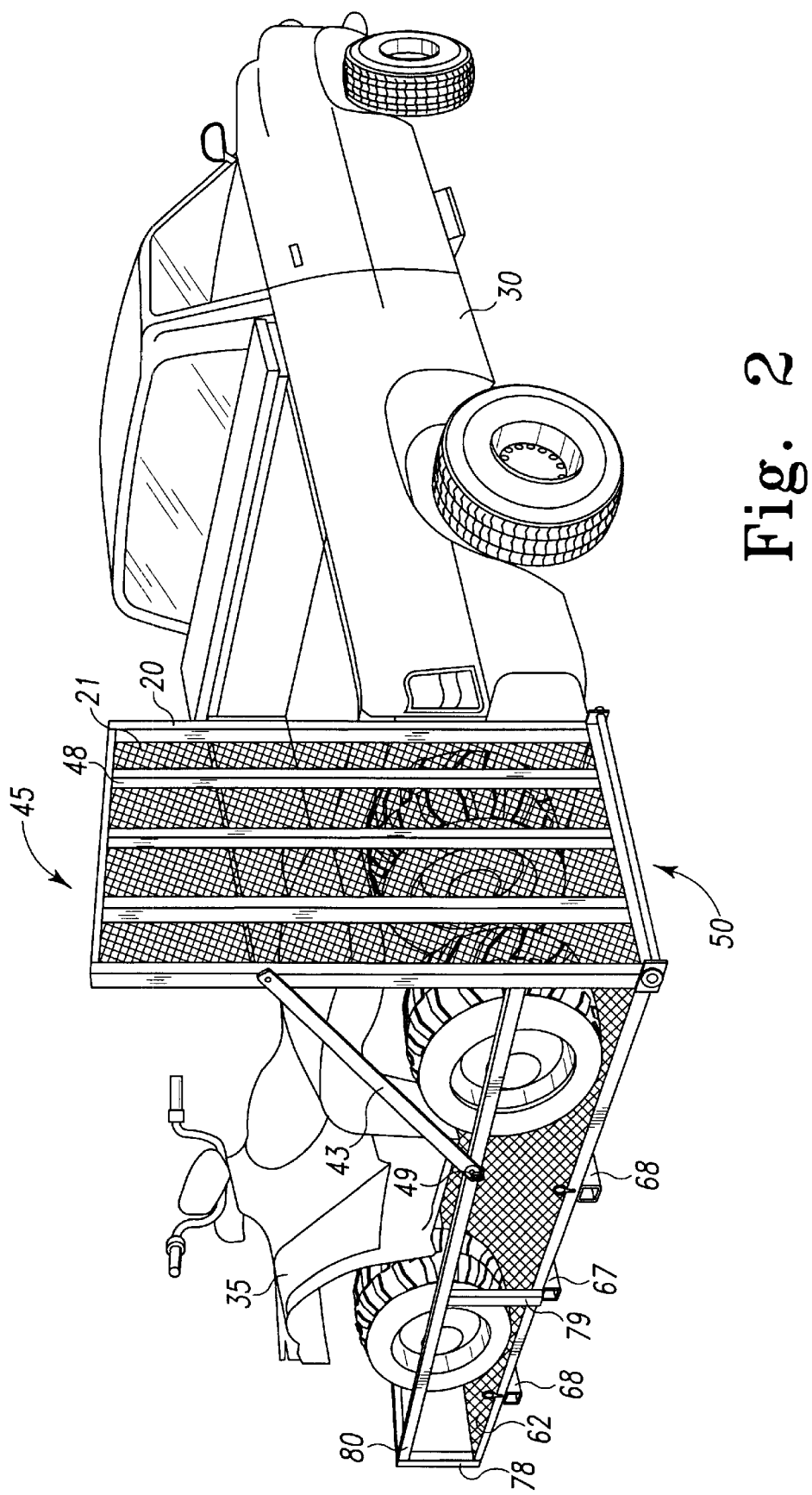
FIG. 2 is a perspective view of another embodiment of the present invention showing a carrier rack attached to a pickup truck and carrying an all terrain vehicle.

Referring now to the drawings, in particular FIGS. 1 and 2, there are illustrated two embodiments of carrier racks of the present invention designed for removable attachment to a common receiver-style trailer hitch of a hauling vehicle 30 utilizing a three-point attachment system. FIG. 1 shows a carrier rack 52 for a motorcycle and FIG. 2 shows a large carrier rack 50 for an all terrain vehicle (ATV), for example. It should be understood that the carrier racks of the present invention could be of different size adapted for the load they are intended to carry. It should also be understood that, although both carrier racks 50 and 52 are depicted as attached to pickup trucks, the carrier racks of the present invention are equally well suited for use with automobiles of a variety of makes and models so long as they are equipped with a receiver styled hitch rated for carrying the load. Special features of the illustrated embodiment, which are described below, are adaptable to all other carrier racks of the present invention.

Figure 3:
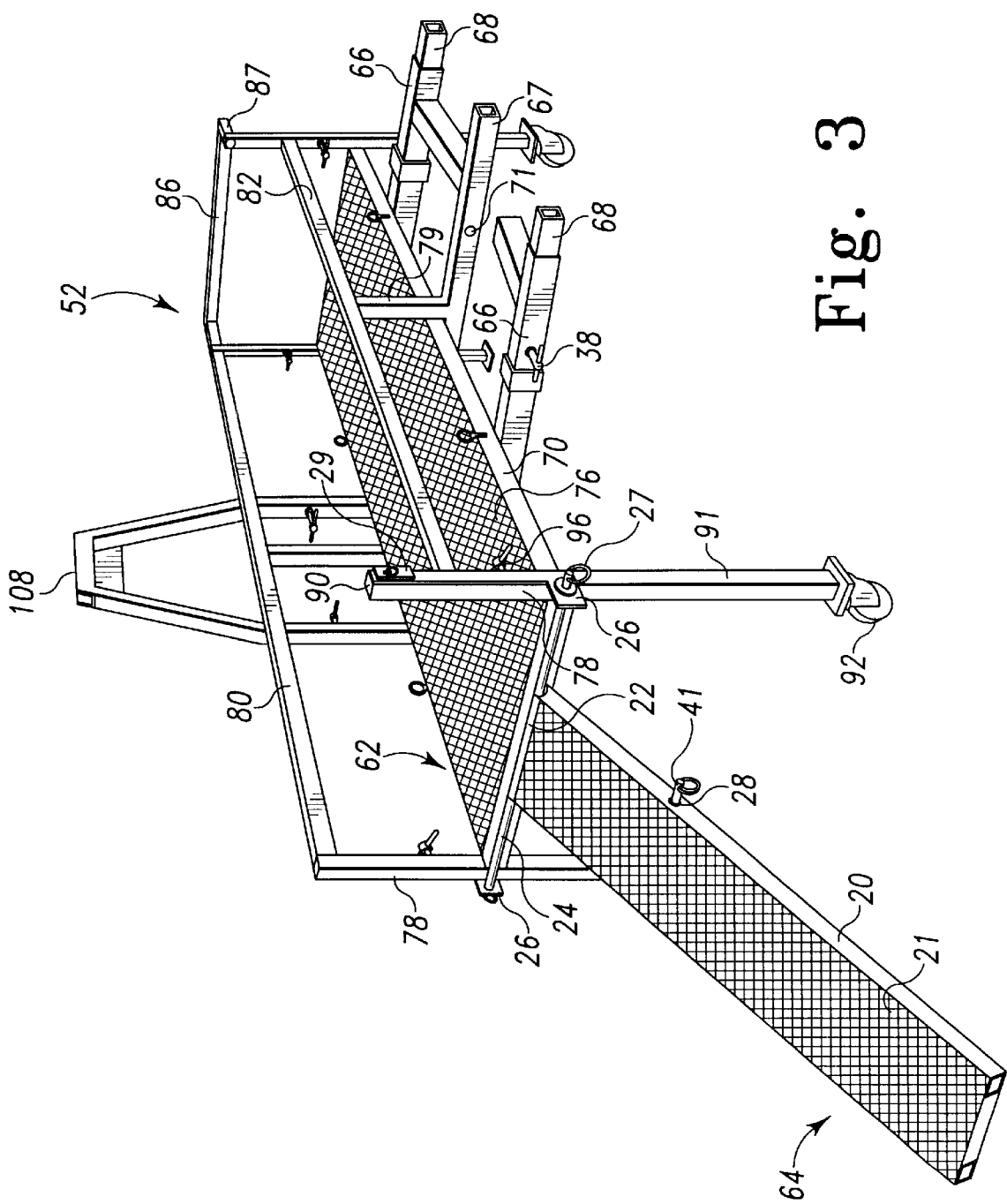
FIG. 3 is a perspective view of the motorcycle carrier rack of FIG. 1 detached from a hauling vehicle.

Referring to FIG. 3, the motorcycle carrier rack 52 comprises a carrying platform 62, guard rails 80, 82, and 84 installed around the carrying platform 62, mounting hardware 66, 67, and 68 attached to the carrying platform 62 and to be received by the hitch assembly of the hauling vehicle 30, ramp 64 for access onto the mounting platform 62, and retractable casters 91, 92, for supporting the carrier rack 52 when not attached to a vehicle. Additionally, the carrier rack 52 preferably has one or more rear safety lights communicatively connected to the electrical system of the vehicle via a wiring harness (see FIG. 14), and also a removable tailgate 108 for easily seeing the rear edge of the carrier rack 62.

The carrying platform 62 preferably extends crosswise to substantially the same width as the hauling vehicle 30 and lengthwise sufficient to accommodate the intended cargo. The carrying platform 62 comprises a supporting frame and a metal mesh floor. The supporting frame is preferably formed by welding together edge support members 70 and three central support members 74. The support members 70 and 74 are preferably of 3/16 inch thick, 2 inch outside dimension (OD) square metal steel tube. Other geometric shaped tubes or solid rods, e.g. aluminum tube stocks, which have similar strength characteristics may also be used.

The support frame of carrying platform 62 is covered by an expanded metal mesh welded at spaced locations to the support member 70, 74 forming the floor 76 to the carrying platform 62. The expanded metal mesh is preferably of #9, 3/4 inch steel mesh grating, but other materials which have similar strength and weathering characteristics may be used.

Guard rails are preferably installed around the carrying platform 62 to prevent the carried vehicle 35 from inadvertently falling off the carrying platform 62. The guard rails comprise vertical corner posts 78 and horizontal rails 80, 82, and 84. The vertical corner posts 78 are secured by welding or are otherwise rigidly mounted to the four corners of carrying platform 62. The corner posts 78 are even at the base with support members 70 and extend upward to a height sufficient to restrain the carried vehicle 35. As illustrated, the corner posts 78 are at a height of approximately the radius of the tires of the carried vehicle 35. Other vertical posts may be welded to the perimeter of the carrying platform at intermediately spaced locations to provide added support for the horizontal rails when necessary, e.g., vertical post 79 of the illustrated embodiment as shown in FIG. 4.

Horizontal rails 80, 82, and 84 are welded to the vertical corner posts 78 to form the restraining barrier for the carried vehicle 35. The back guard rail 80 is preferably welded to a height level with the top of the vertical corner posts 78. The front guard rail 82 is preferably at a lower level than the vertical corner post 78 to give clearance to the rear gate of hauling vehicle 30 and to allow unobstructed access to the vehicle's existing interior cargo area. In the illustrated embodiment, the front guard rail 82 is four inches lower than the top of vertical corner post 78, allowing the tailgate of the pickup truck 30 to be completely opened. Side guard rail 84 is installed on one side of the carrying platform 62, leaving the other side open, allowing clear access thereto. In addition, modification can be made to the side guard rail 84 to accommodate an extra long carried vehicle 35. Referring to FIG. 4, a U-shaped guard rail 85 replaces the straight side guard rail 84. The U-shaped guard rail 85 comprises a straight portion 86 spanning the distance between the vertical corner posts 78 and two side arms 87. Preferably, the length of two side arms 87 is less than the radius of the tire of the carried vehicle 35, such that when the front most portion of the tire of the carried vehicle 35 engages straight portion 86 of the U-shaped guard rail 85, the bottom portion of the tire where the weight of the carried vehicle 35 concentrates is still engaged to the carrying platform 62. The side arms 87 of U-shaped guard rail 85 of the illustrated motorcycle carrier rack 52 are approximately 8 inches long.

The vertical corner posts 78 are constructed of metal tubing with an open central channel 90 (FIG. 10) and preferably formed of 3/16 inch thick, 2 inch outside dimension square steel tubes. For aesthetic and convenience reasons, the horizontal guard rails 80, 82, 84, and 85 are formed of the same material as the vertical corner posts 78. Clearly, if desired, horizontal guard rails, 80, 82, 84 and 85 may be formed of solid metal, other geometrically shaped tubular metal, or any other suitably strong construction material.

Figure 4:
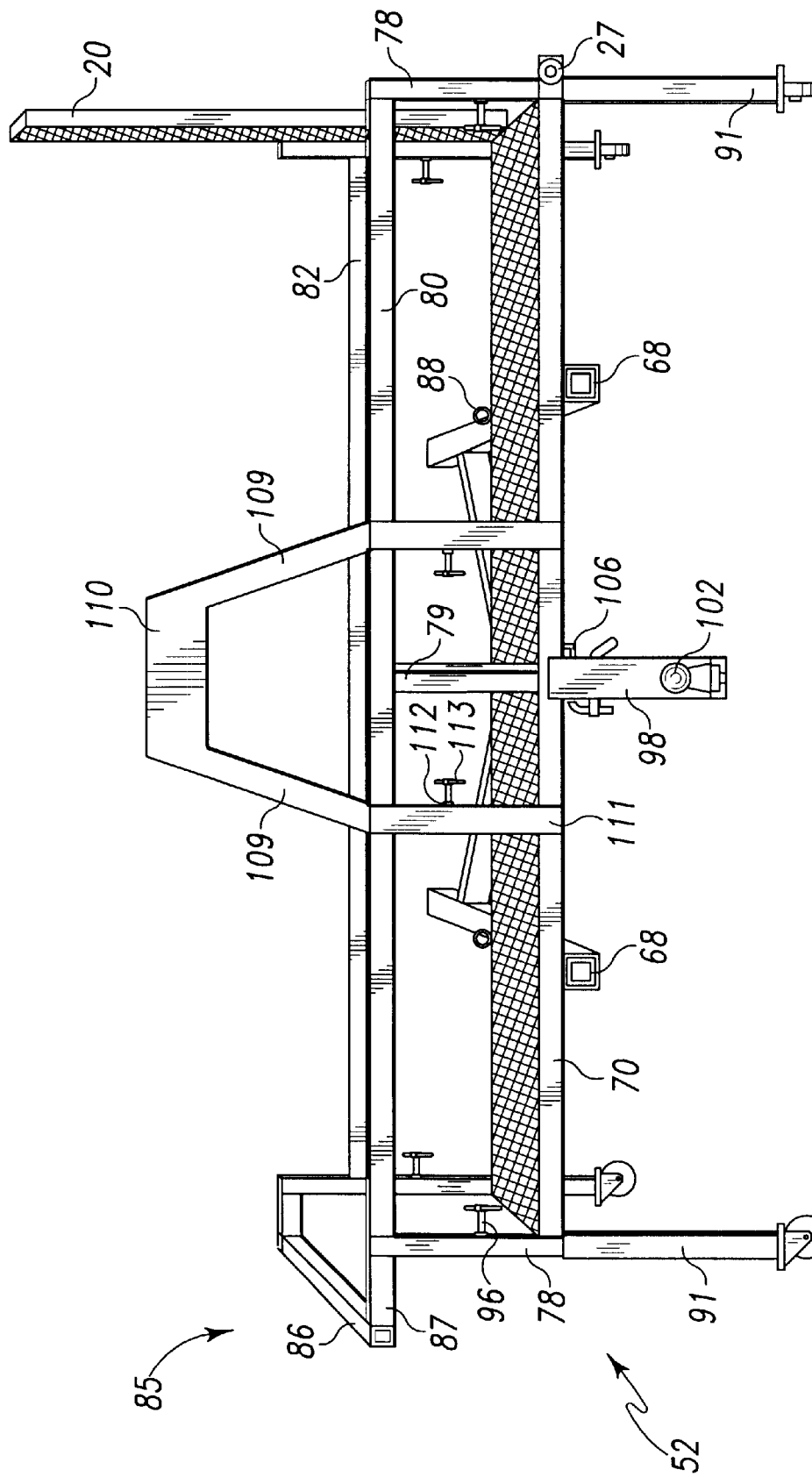
FIG. 4 is a rear perspective view of the motorcycle carrier rack of FIG. 1.
Figure 8:
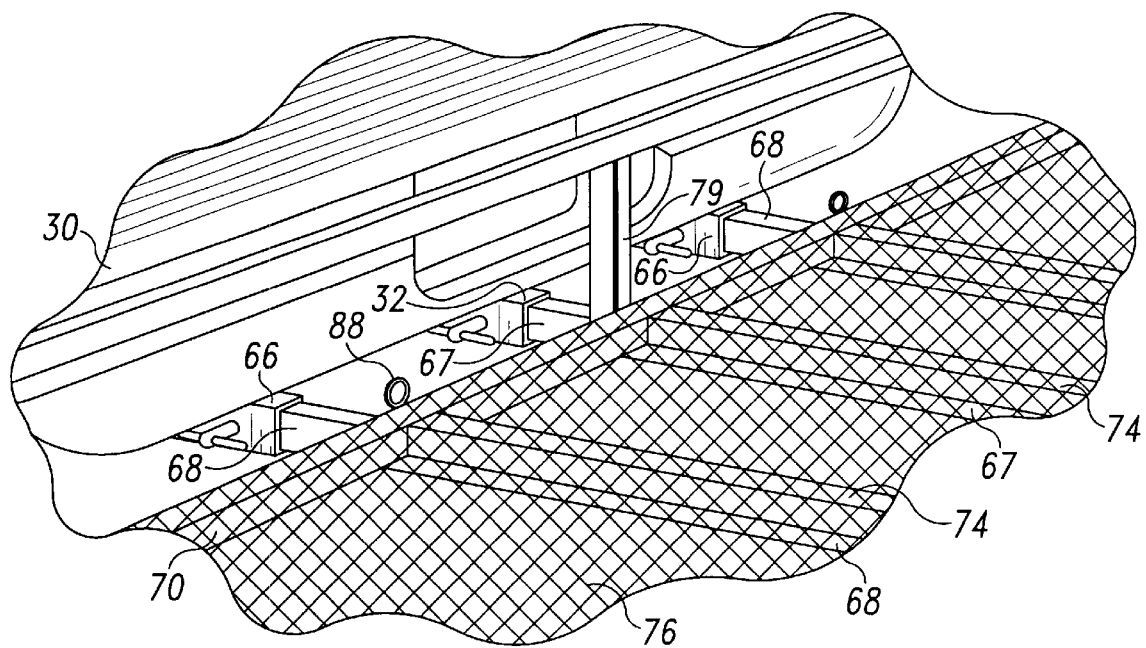
FIG. 8 is a perspective close-up view of the carrier rack attached to a vehicle.

As best seen in FIGS. 4 and 8, eyelets 88 attached at locations spaced around the perimeter of the carrying platform 62 are provided to receive load straps for restraining cargo. The eyelets are preferably of metal construction, but other suitable materials may be used.

Figure 5:
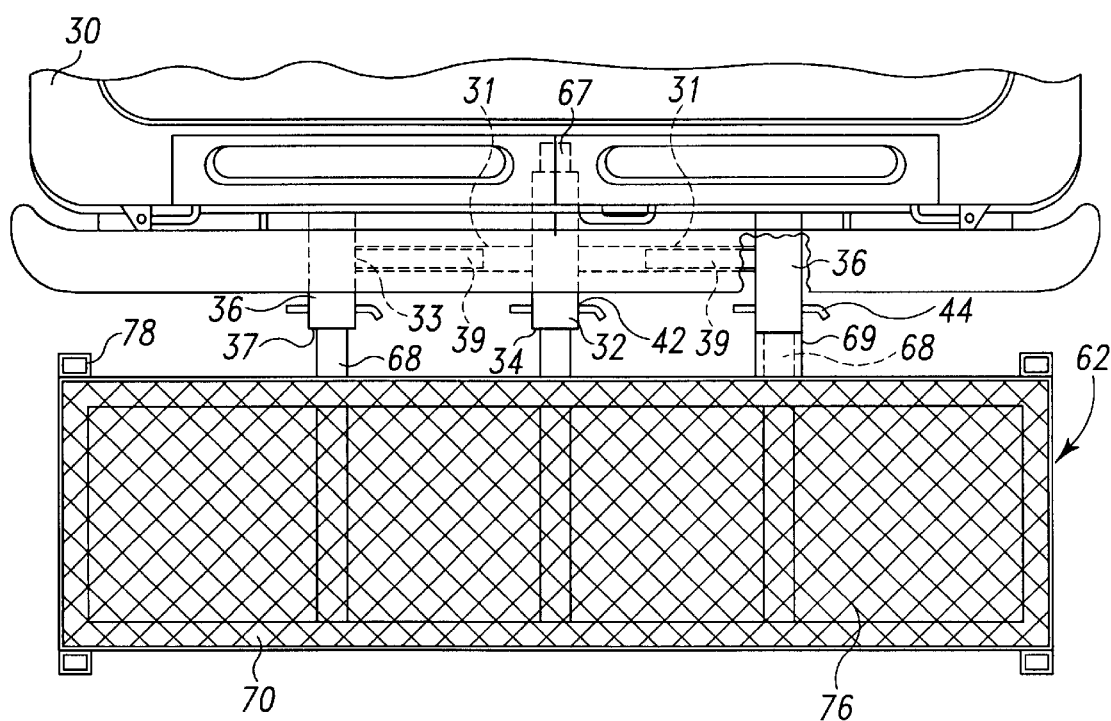
FIG. 5 is a top plan view of the motorcycle carrier rack of the present invention showing the attachment location of the mounting hardware.

The carrier rack 52 is removably attached to three different locations on the hitch assembly of the hauling vehicle 30. Referring to FIG. 5, the hitch assembly is a commonly used receiver-style trailer hitch of the type having a tubular member 31 with an open central channel disposed in parallel to and under the rear bumper of the hauling vehicle 30. The tubular member 31 includes two distal end openings 33 and a central extended tubular portion 32 also having an open channel 34. The central extended tubular portion includes an aperture 42 for receiving a connection pin.

Figure 6:
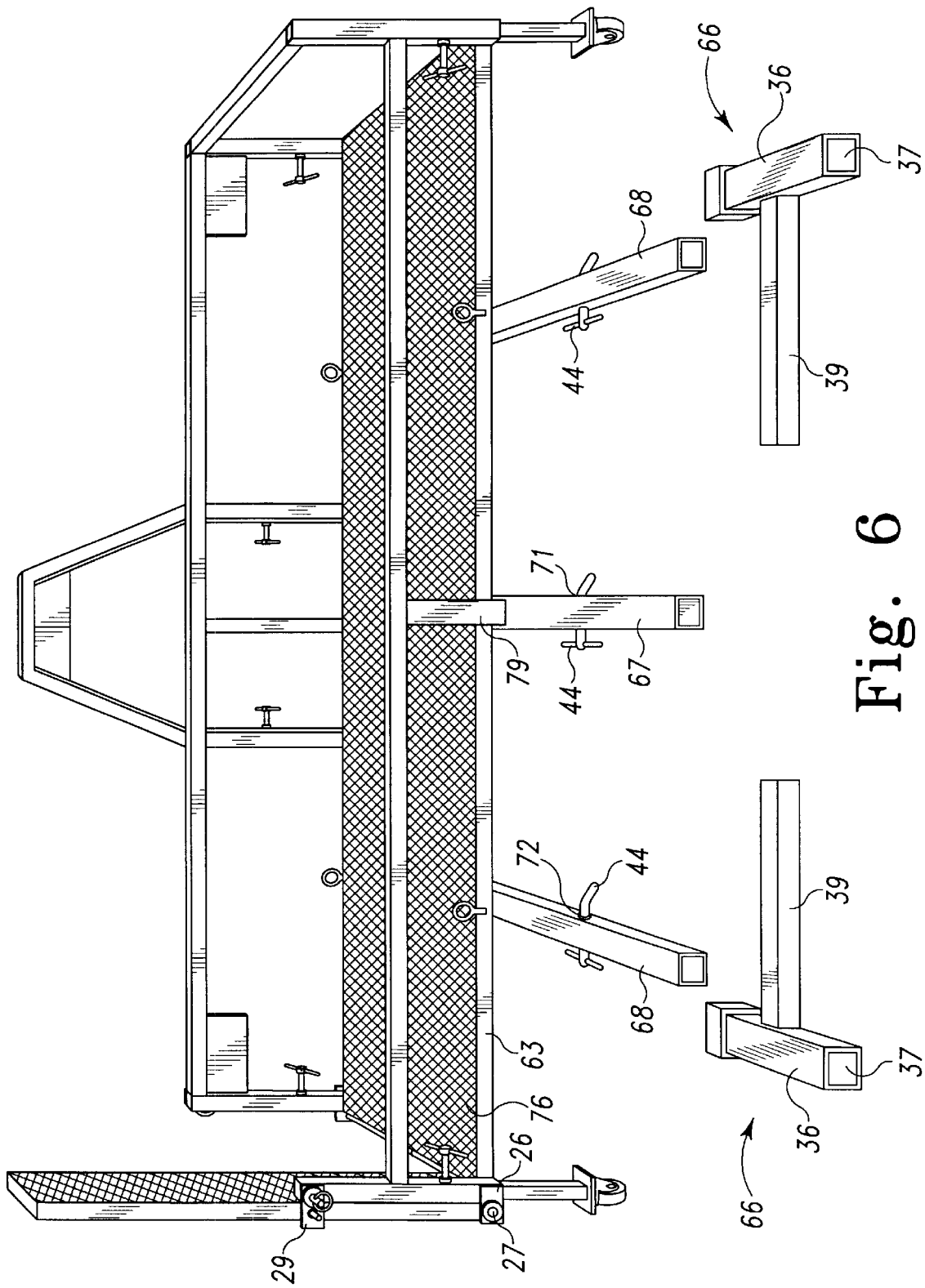
FIG. 6 is a perspective view showing the mounting hardware of the carrier rack of the present invention, unassembled.
Figure 7:
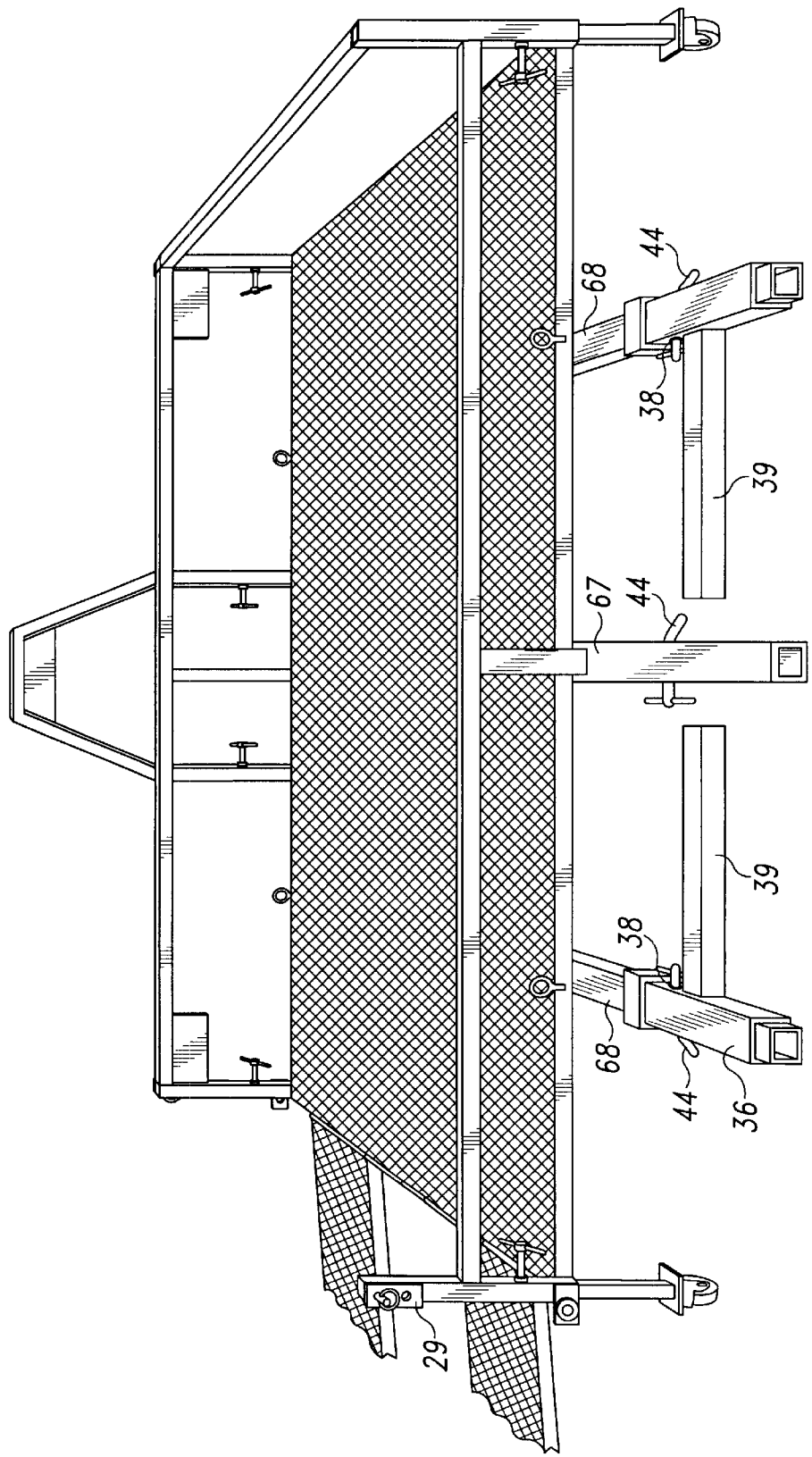
FIG. 7 is a perspective view showing the mounting hardware of the carrier rack, semi-assembled.

The hitch mounting hardware comprises one center mounting bar 67, two side mounting bars 68, and a mirror image pair of connection members 66. The connection members 66 as illustrated in FIGS. 6 and 7 are preferably T-shaped structures formed by integrally joining a tubular top bar 36 and a stem bar 39. The stem bar 39 may be of tubular or solid construction, and is sized for insertion into the distal openings 33 of tubular member 31. The length of the stem bar 39 should be long enough to be securely retained within the cross tube but not too long as to interfere with the open channel 34 of tubular member 31. Top bar 36 includes an open channel 37 which is sized for receiving the side mounting bar 68 and is horizontally apertured at 38 (FIG. 3) for receiving a connection pin.

The mounting bars 67 and 68 are integrally attached to the underside of the carrying platform 62 and extend forward from the rear edge 54 of the carrying platform 62 towards the rear of vehicle 30. The mounting bars 67 and 68 are sized to be received within the interior of the open channels 34 of tubular member 31 and open channel 37 of top bar 36 and include apertures 71 and 72, respectively, for receiving fasteners. The apertures 71 and 72 are preferably ⅝ inch diameter holes suitable for hitch pins.

For added rigidity, support sleeves may be fitted over the mounting bars 67 and 68. Referring to FIG. 5, support sleeve 69 is a short section of hollow metal tubing sized to fit over and is welded to the mounting bar 68. Even though only one support sleeve is shown in FIG. 5, it is understood that support sleeves can be fitted to each of the mounting bars 67 and 68. The added thickness of the support sleeves 69 enhances the rigidity of the mounting bars 67, 68 and enables the mounting bars 67, 68 to better withstand the bending stresses exert by carrying platform 62.

When attaching the carrier rack 52 to hauling vehicle 30, stem bar 39 is first inserted into the distal openings 33 of tubular member 31 and so orientated that the open channels 37 of top bar 36 face rearward and are in horizontal alignment with the open channel 34 of tubular member 31. The mounting bars 67 and 68 are then inserted into open channels 34 and 37, respectively. The apertures 72 and 71 are aligned with the aperture 38 of the top bar 36 and aperture 42 of the extended tubular portion 32, respectively. A fastener 44, e.g. a hitch pin, shaft, or bolt is inserted through the aligned pairs of apertures 38 and 72, 42 and 71 and securely attach the carrier rack 62 to the hitch assembly of the hauling vehicle 30 (FIG. 8). In the illustrated embodiment, fastener 44 is a conventional hitch pin sized for a ⅝ inch diameter aperture.

Figure 9:
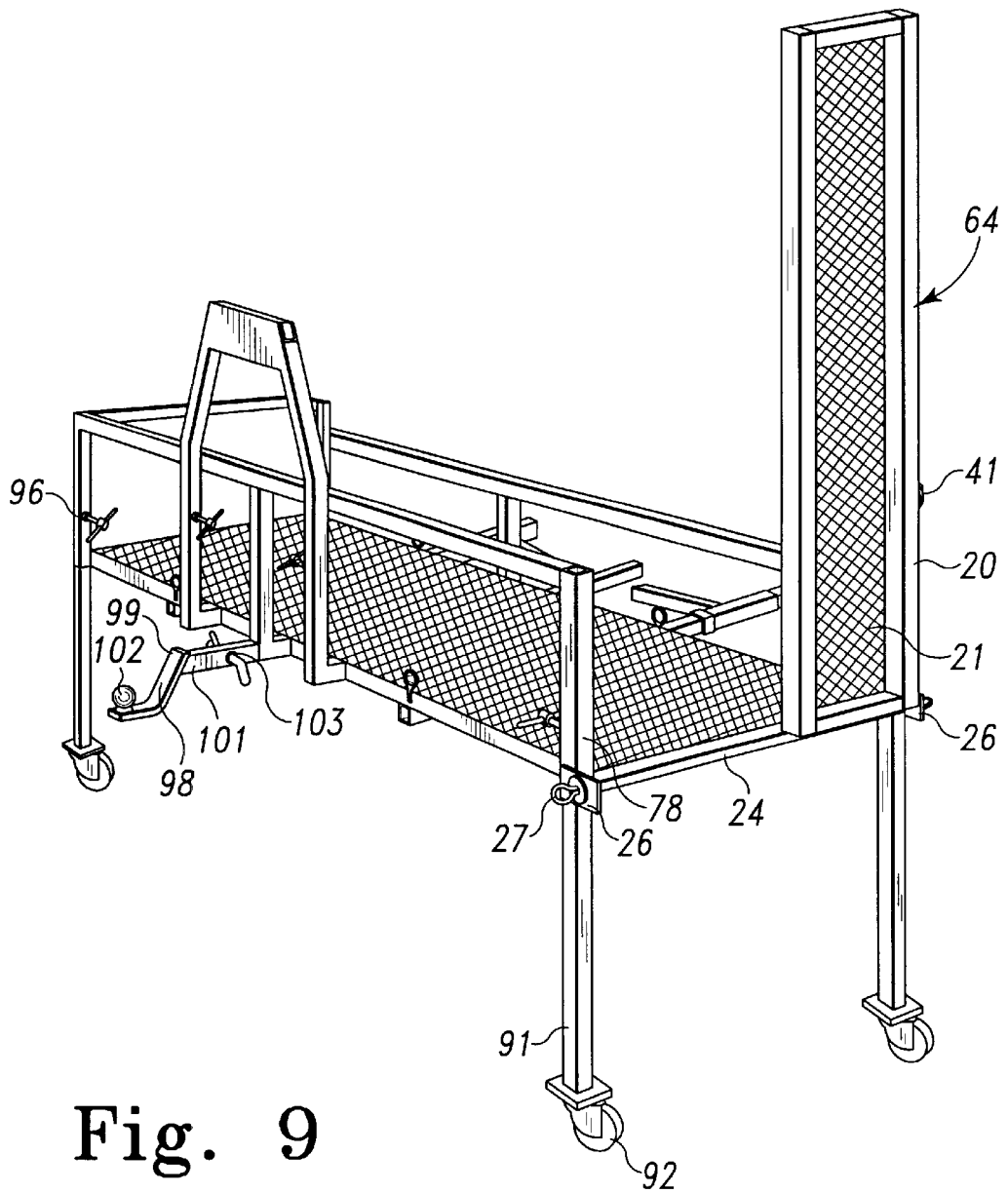
FIG. 9 is a perspective view showing the guide rod and the retaining pull ring for the ramp.

Referring to FIGS. 3 and 9, access for the carried vehicle 35 to the carrying platform 62 is via a ramp 64 which is pivotally, slidingly and removably mounted to one side of the carrying platform 62. Ramp 64, similarly constructed as the carrier platform 62, includes a ramp frame 20 covered with expanded metal mesh 21 which is welded to ramp frame 20. When necessary, spaced reinforcing frame members may be disposed beneath the expanded metal mesh 21 to give support. The ramp frame 20 is apertured at 28 for receiving a locking pin. A sleeve 22 integrally attaches to the top edge of the ramp frame 20 for receiving a guide rod 24 upon which the ramp 64 can slide and pivot. A pair of brackets 26, each having an aperture and welded to opposing vertical corner posts 78 at slightly below the expanded metal mesh floor 76 of the carrying platform 62, are provided to receive guide rod 24. Ramp 64 is attached to the carrying platform 62 by inserting guide rod 24 into sleeve 22, the guide rod 24 being received by the aperture of brackets 26. A retainer pull ring 27, or any equivalent fastener, locks and secures guide rod 24 to bracket 26. To facilitate the loading and unloading of the carried vehicle 35, the ramp 64 can slide along the guide rod 24 to align with the tires of the carried vehicle 35.

Figure 10:
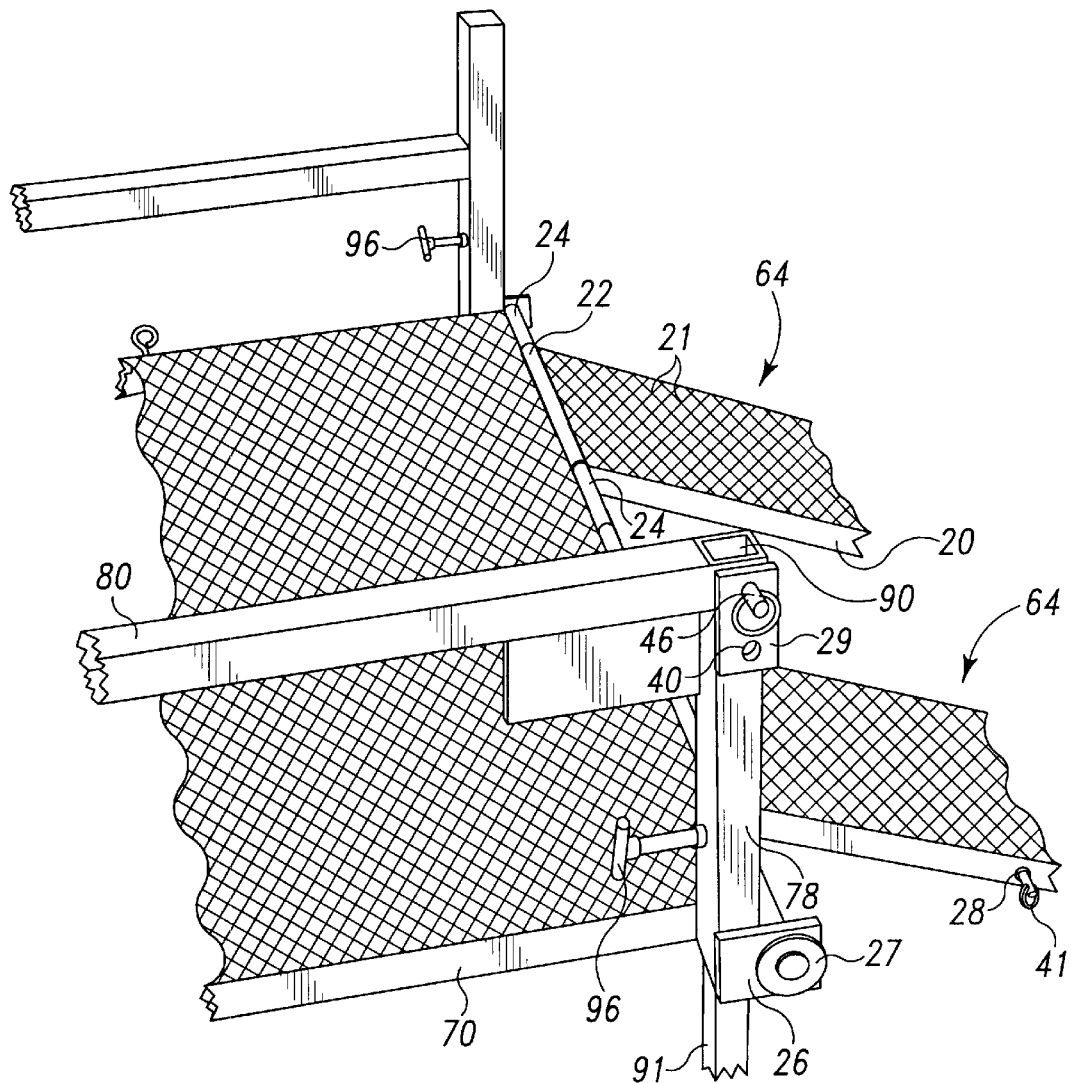
FIG. 10 is a perspective view of the support bracket arms of the ramp.

Referring to FIGS. 9 and 10, ramp 64 is carried in a vertical position during transit. A support bracket arm 29 is provided for securing the ramp in the vertical position. Support bracket arm 29 is rotatably mounted near the top of the vertical corner posts 78 with a fastener pin 46. The support bracket arm 29 is apertured at 40 to receive a locking pin. To secure the ramp for transit, ramp 64 is moved adjacent to vertical corner post 78 and pivoted upon guide rod 24 to a vertical position such that ramp frame 20 rests on the support member 70 of carrying platform 62. The support bracket arm 29 rotates out such that aperture 40 is aligned with aperture 28 of ramp frame 20. A locking pin 41 inserted through the aligned apertures 28 and 40 secures the ramp 64 to carrying platform 62.

Figure 11:
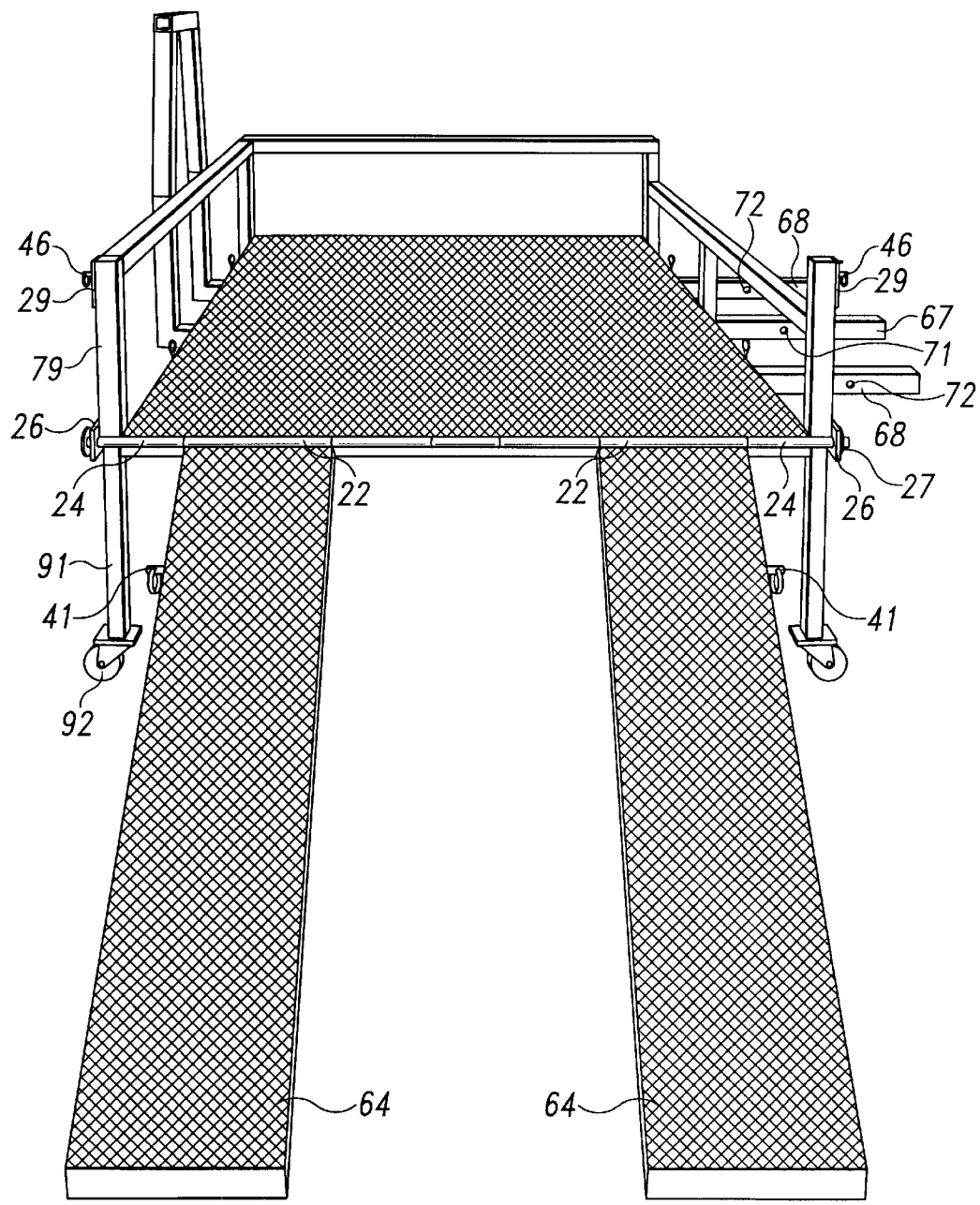
FIG. 11 is a perspective view showing an embodiment of the carrier rack having two ramps.

Referring to FIGS. 10 and 11, for loading and unloading vehicles having wheels on opposing ends of an axle, an embodiment of the present invention having two ramps is provided. Both ramps are carried by the same guide rod 24 and can be attached to carrying platform 62 with similar support brackets 26 and retaining pull rings 27.

Figure 12:
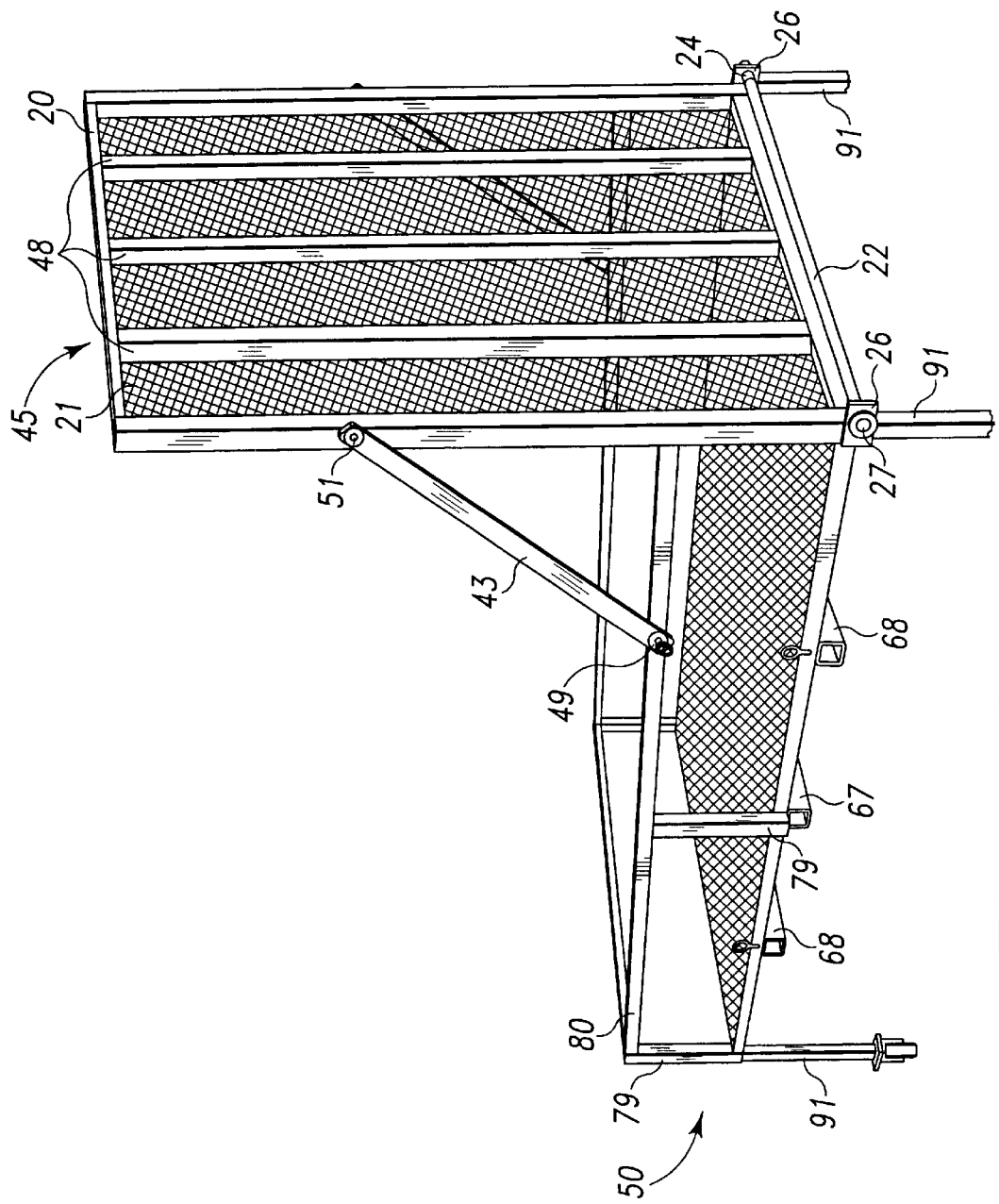
FIG. 12 is a perspective view showing yet another embodiment of the carrier rack having a full width ramp secured in vertical position.

Another embodiment of the carrier rack of the present invention having a full width ramp 45 is shown in FIG. 12. Ramp 45 is suited for loading and unloading a vehicle with large tires. As shown, spaced reinforcing frame members 48 welded to ramp frame 20 are disposed beneath the expanded metal mesh 21 to give added support. The ramp 45 is hingedly attached to the carrying platform using the sleeve 22, guide rod 24 and brackets 26 assembled like the narrower ramp 64 described above.

A pair of brace bars 43 which attach via locking pins 49 and 51 at one end to horizontal guard rail 80, and at the other end to the ramp frame 20, respectively, holds ramp 45 in a vertical position for transit.

In yet another embodiment of the present invention, the carrier rack is equipped with ramps on opposite ends of the carrying platform for loading and unloading vehicles such as snowmobiles which do not reverse.

Figure 15:
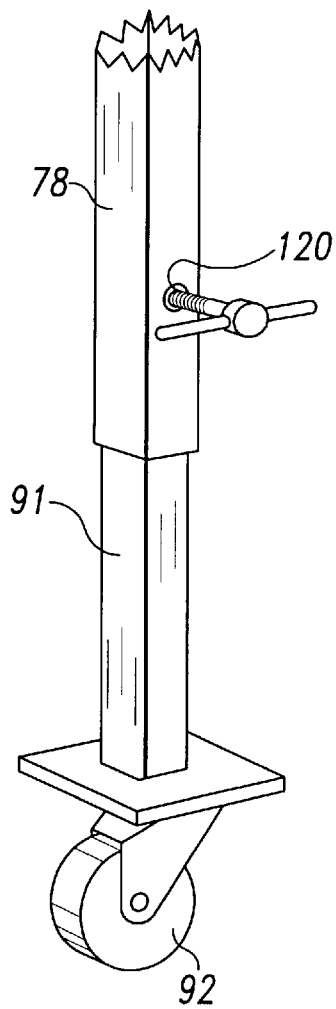
FIG. 15 is a perspective view of a first embodiment caster post locking arrangement.

The carrier rack is equipped with a retractable caster assembly capable of supporting the carrier rack 52 when not attached to a hauling vehicle 30. As shown in FIGS. 1 and 3, the retractable caster assembly comprises swivel caster 92 which is integrally attached to a caster post 91. The caster post 91 is dimensioned to fit within the open central channel 90 of the vertical corner post 78 of the carrier platform 62. The caster post 91 is of the length such that when in the lower position, a sufficient amount of the caster post 91 remains confined within the vertical corner post 78. In a first embodiment illustrated in FIG. 15, vertical corner post 78 contains a threaded aperture 120 extending into the open central channel 90. A threaded T-handle 122 is engaged with the aperture 120. When the T-handle 122 is backed away from the caster post 91, the post 91 may be freely slid within the vertical corner post 78 to any desired position. Once the desired position has been reached, the T-handle 122 is tightened against the caster post 91, thereby locking it in position.

Figure 16:
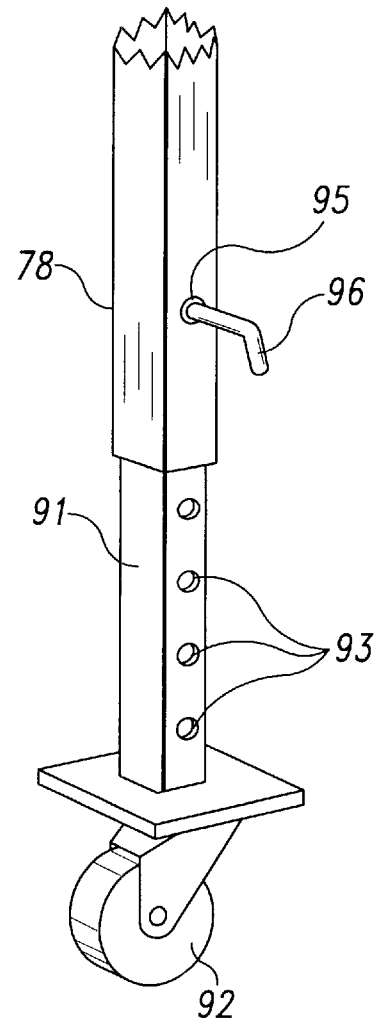
FIG. 16 is a perspective view of a second embodiment caster post locking arrangement.

In a second embodiment illustrated in FIG. 16, the caster post 91 is apertured at a plurality of positions 93. When the caster post 91 is lowered, the one of the apertures 93 is aligned with an aperture 95 on the vertical corner post 78 and can be locked in position by a locking pin 96. When the caster post is in the raised position, a different aperture 93 aligns with the aperture 95 on the vertical corner post 78 and the caster post 91 can be similarly locked in this position by the locking pin 96. The caster posts 91 are preferably constructed of tubular metal having a square cross sectional area, but other materials having similar strength characteristics may be used. The casters 92 are preferably 3" in diameter, but other casters capable of supporting the load may be used.

By using the retractable caster post 91, the casters 92 may be locked in a position close to the vertical center post 78, where they will not interfere with operation of the hauling vehicle 30 or the carrier rack 50/52. When it is desired to remove the carrier rack 50/52 from the hauling vehicle 30, the casters 92 may be lowered to ground level and locked. The casters 92 will therefore support the carrier rack 50/52 during and after removal from the hauling vehicle 30. Also, because the vertical positions of the caster posts 91 are independently adjustable, the carrier rack 50/52 can be supported on uneven ground while being removed from the hauling vehicle 30.

Figure 13:
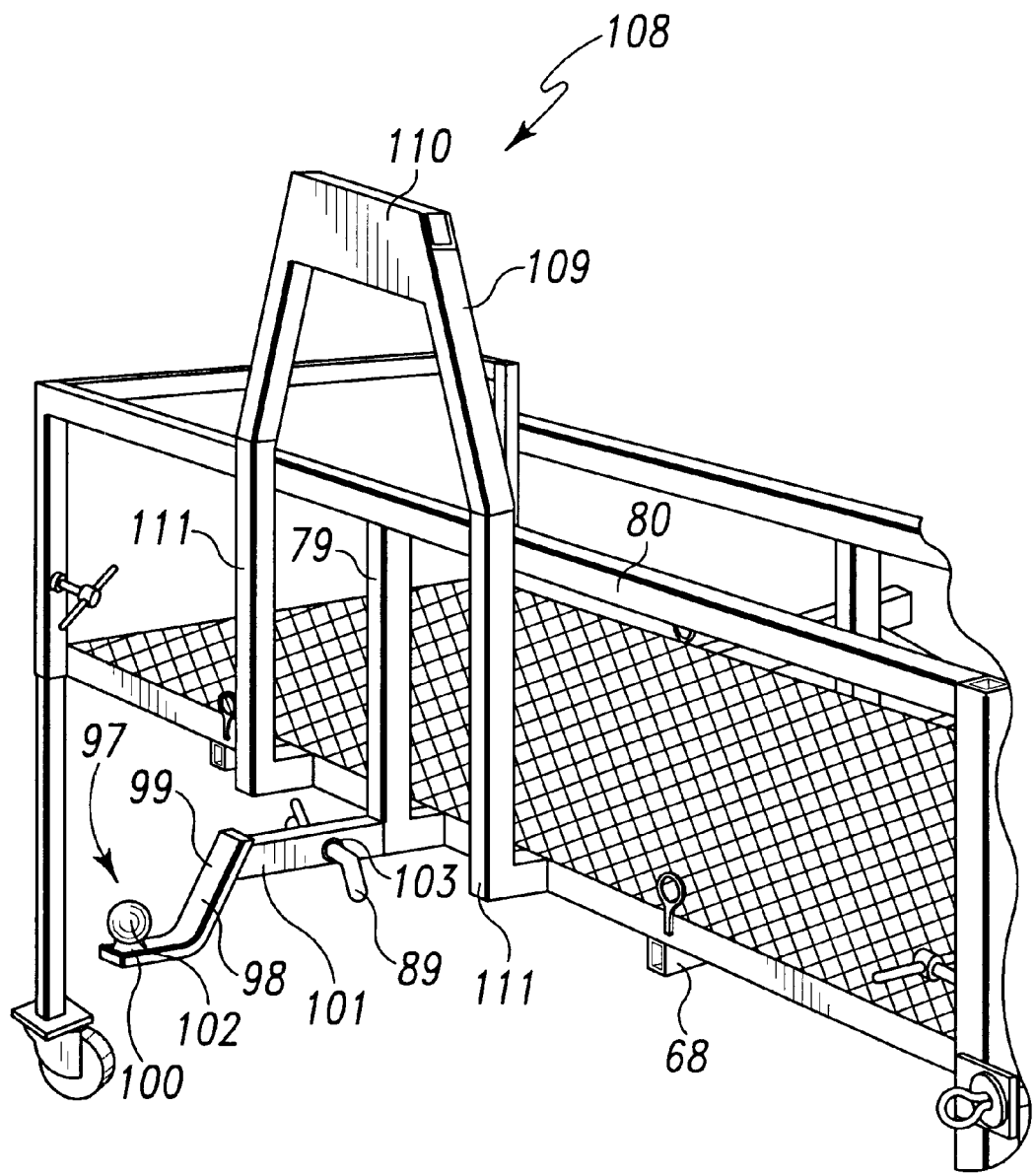
FIG. 13 is a perspective view showing the rear hitch assembly of the carrier rack.

For additional towing capacity, a removable rear hitch 97 is provided. Referring to FIG. 13, the rear hitch assembly comprises a J-shaped bar 98 having a top end 99 and a distal end 100. The distal end 100 is apertured for receiving a conventional ball style hitch pin 102. The top end 99 of J-shaped bar 98 is welded to a tubular extension (not shown) that is received within a tubular rail 101 welded to the carrier rack 50/52. The rear hitch 97 is removably secured to the carrier rack 50/52 via a hitch pin 89 inserted through an aperture 103 on the tubular rail 101 and an aperture (not shown) in the extension of the J-shaped bar 98.

Figure 14:
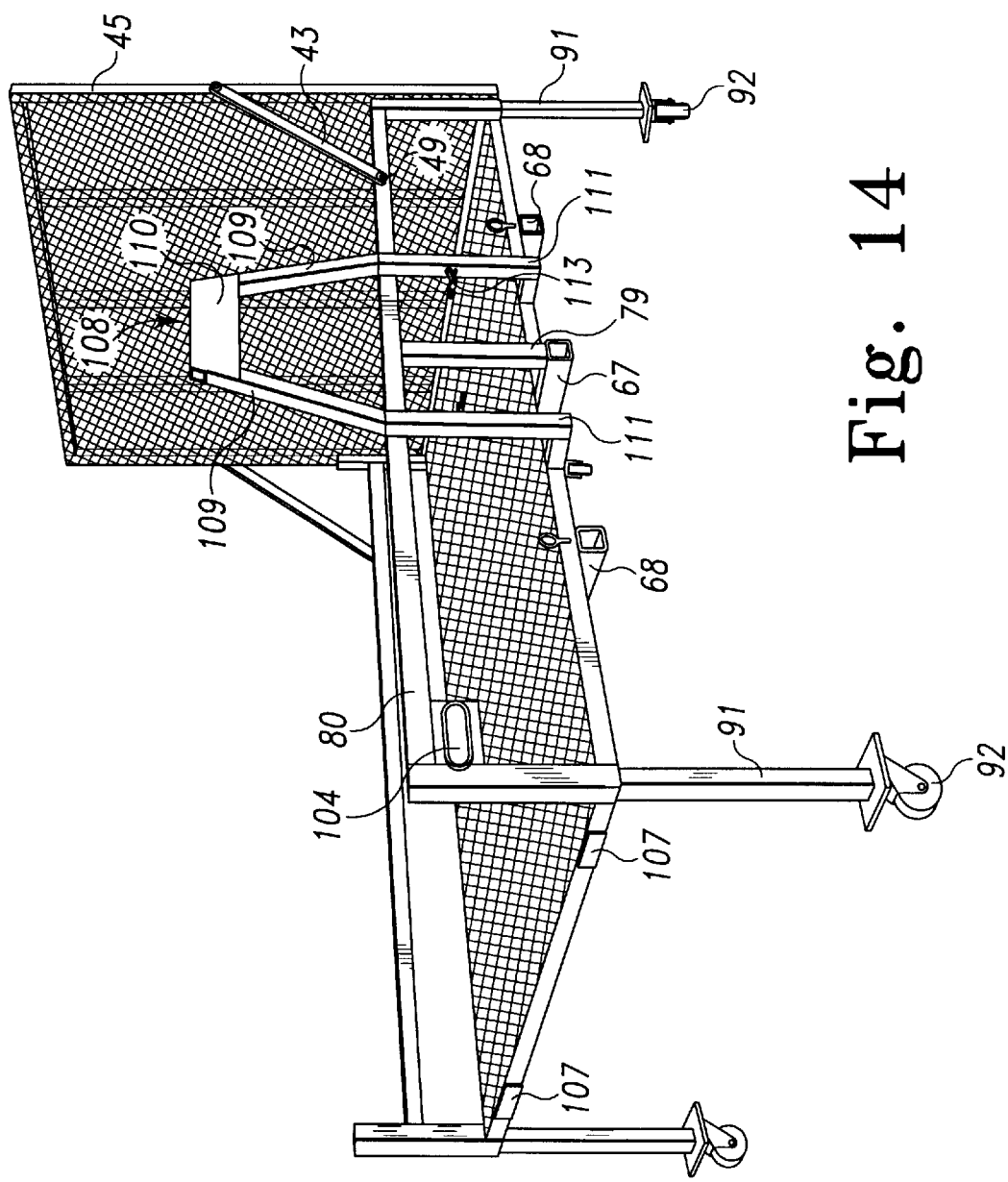
FIG. 14 is a perspective view showing an embodiment of the carrier rack having safety reflectors, casters and a removable rear gate.

If road ordinances and related legislation requires, the carrier rack can be fitted with taillights and a registration number plate. Referring to FIG. 14, tail lights 104 are attached to the guide rails 80. The tail lights are connected to the hauling vehicle via a conventional wire harness. A conduit 106 (shown in FIG. 4), extended front to back of carrying platform 102 is provided for the protection of the wiring harness. For added safety, reflectors 107 can be removably attached to the guard rails 80, 82, and 84.

Also for added safety, a removable tailgate 108 is provided. Referring to FIGS. 3 and 13, the removable tailgate 108 is installed above the rear guard rails 80 enabling the driver to locate the rear edge of the carrying platform 62. The removable tailgate 108 illustrated comprises two diagonal bars 109 integrally joined to two inserts (not shown) at one end and to a trapezoidal shaped panel 110 at the opposing end. A pair of brace tubes 111 having apertures 112 and welded to the rear guard rail 80 are provided to receive the inserts (not shown) and retain removable tailgate 108. The removable tailgate 108 can be further secured by a locking T-handled retaining pins 113 inserted through aperture 112 on the brace tubes 111 and the inserts (not shown). In addition to serving as the locator for the carrying platform 62, the trapezoidal shaped panel 110 may also be used as an advertising board.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A carrier rack for a vehicle having a vehicle frame, the rack comprising:

a carrying platform;

a support frame coupled to said carrying platform; and a plurality of independently retractable and adjustable casters operationally connected to said carrying platform;

wherein said support frame is releasably coupled to said support frame at least three locations; and wherein each respective one of said retractable and adjustable casters may be independently adjusted such that said platform may be levelly supported on uneven ground.

2. A carrier rack for a vehicle having a receiver-style hitch assembly, the rack comprising:

a carrying platform;

hitch mounting hardware coupled to said carrying platform;

wherein said hitch mounting hardware is releasably coupled to said receiver-style hitch assembly at least three locations;

wherein the hitch mounting hardware further comprises a central coupler member and two end coupler members; and wherein the two end coupler members are removably connectable between the receiver-style hitch assembly and the carrying platform.

3. The carrier rack of claim 2, wherein said hitch mounting hardware comprise:

a center mounting bar and two side mounting bars coupled to said carrying platform, wherein said center mounting bar is adapted for insertion into a center opening of said hitch assembly;

a pair of connection members each comprising a top bar and a stem bar coupled together in an orthogonal relationship, said stem bars are adapted for insertion into opposing distal openings of said hitch assembly, each said top bar further comprising a channel, wherein said channels are adapted to receive said side mounting bars;

whereby after slidingly receiving stem bars in said distal openings of said hitch assembly, said center mounting bar and said side mounting bars can be aligned with said center opening of said hitch assembly and said channels in said top bars, respectively, thereby allowing said mounting bars to be received and releasably secured to said hitch assembly.

4. The carrier rack of claim 3, further comprising retractable and adjustable casters coupled to corners of said carrying platform.

5. A carrier rack for a vehicle having a receiver-style hitch assembly, the rack comprising:

a carrying platform;

hitch mounting hardware coupled to said carrying platform; and at least one ramp pivotally coupled to a side of said carrying platform;

wherein said hitch mounting hardware is releasably coupled to said receiver-style hitch assembly at least three locations.

6. The carrier rack of claim 5, wherein said ramp has a top edge and a sleeve integrally attaching thereto, wherein said carrier rack further comprises a guide rod extending along said side of said carrying platform, wherein said guide rod is received in said sleeve thereby coupling said ramp to said carrying platform.

7. The carrier rack of claim 6, further comprising two ramps pivotally coupled to said side of said carrying platform.

8. The carrier rack of claim 6, further comprising two ramps pivotally coupled to opposing sides of said carrying platform.

9. The carrier rack of claim 6 further comprising horizontal guard rails supported by vertical guard posts, said horizontal guard rails comprising front, rear and side guard rails, wherein said front guard rail is at a height allowing a rear gate of said vehicle to be opened.

10. The carrier rack of claim 9, wherein said carrying platform comprises a supporting frame and a metal mesh floor, said supporting frame constructed of 3/16 inch thick, 2 inch by 2 inch square steel tube, and said metal mesh floor is constructed of #9, 3/4 inch steel mesh grating.

11. The carrier rack of claim 10, wherein said carrying platform is adapted to accommodate an all terrain vehicle.

12. The carrier rack of claim 11, wherein said ramp is a full width ramp.

13. The carrier rack of claim 10, wherein said side guard rail is an U-shaped bar.

14. The carrier rack of claim 13, wherein said carrying platform is adapted to accommodate a motorcycle.

15. The carrier rack of claim 14, further comprising a rear hitch extension coupled to opposing sides of said carrying platform.

16. The carrier rack of claim 14, further comprising a removable tailgate, wherein said tailgate is installed above said rear guard rail thereby allowing a driver to locate a rear edge of said carrier rack.

17. A carrier rack for a hauling vehicle having a receiver-style hitch assembly with a central opening and two distal openings, comprising:

a carrying platform;

three mounting bars coupled to said carrying platform;

retractable and adjustable casters coupled to corners of said carrying platform;

at least one ramp coupled to the carrying platform;

a pair of connection members, wherein each of said connection members includes a stem bar and a top bar, wherein said stem bars are adapted for insertion in said distal openings of said hitch assembly, and said top bars are adapted to receive said mounting bars;

wherein, after said stem bars are slidingly received in said opposing distal openings of said hitch assembly, said three mounting bars are releasably received in said central opening of said hitch assembly and said top bars, thereby allowing said carrier rack to be securely coupled to said vehicle in three locations; and wherein said carrying platform is adapted for hauling other motorized vehicles.

18. The carrier rack of claim 17, further comprising:

vertical guard post and horizontal guard rails, wherein said horizontal guard rails are elevated above said carrying platform and supported by said vertical guard posts, said horizontal guard rails further including front, rear and side guard rails, wherein said front guard rail is positioned at a height to allow a rear gate of said hauling vehicle to open, and wherein said side guard rail is a u-shaped bar;

a removable tailgate, wherein said tailgate is raised above said rear guard rail thereby allowing a driver of said vehicle to locate a rear edge of said carrier rack, said tailgate further including flat areas for placement of advertisement and logo; and a removable rear hitch assembly.

\* \* \* \* \*

UNITED STATES PATENT AND TRADEMARK OFFICE
CERTIFICATE OF CORRECTION

PATENT NO. : 6,502,730 B2  Page 1 of 1
APPLICATION NO. : 09/756341
DATED : January 7, 2003
INVENTOR(S) : Danny R. Johnson It is certified that error appears in the above-identified patent and that said Letters Patent is hereby corrected as shown below:

On Title Page, Item (56)
In the "References Cited" please delete all of the references listed and replace them with the following:

U.S. PATENT DOCUMENTS

| | | | |
|---|---|---|---|
| 1,367,654 | | 2/1921 | Borden |
| 3,757,972 | | 9/1973 | Martin ................214/85 |
| 3,720,333 | * | 3/1973 | Vaughn............224/402 X |
| 4,593,840 | * | 6/1986 | Chown.........224/42.44 X |
| 4,610,458 | | 9/1986 | Garnham...........280/485 |
| 4,744,590 | * | 5/1988 | Chesney.............280/769 |
| 4,815,638 | * | 3/1989 | Hutyra.............224/402 X |
| 4,906,015 | | 3/1990 | LaCroix et al. ...280/415.1 |
| 4,971,509 | * | 11/1990 | Sachovec et al...414/462 |
| 5,092,503 | | 3/1992 | Cocks .............224/42.44 |
| 5,033,662 | * | 7/1991 | Godin.................296/43 X |
| 5,224,636 | * | 7/1993 | Bounds...........224/42.44 |
| 5,427,289 | | 6/1995 | Ostor............224/42.430 |
| 5,553,762 | | 9/1996 | Brown................224/403 |
| 5,586,702 | | 12/1996 | Sadler................224/521 |
| 5,692,659 | | 12/1997 | Reeves ..............224/536 |
| 5,699,985 | * | 12/1997 | Vogel ................224/564 |
| 5,730,577 | | 3/1998 | Jones.................414/462 |
| 5,769,449 | | 6/1998 | Keesee ............280/656 |
| 5,826,768 | | 10/1998 | Gamulo..............224/488 |
| 5,924,835 | | 7/1999 | Ross .................414/462 |
| 5,996,869 | * | 12/1999 | Belinky et al........224/510 |
| 6,006,973 | * | 12/1999 | Belinky et al........224/510 |
| 6,105,843 | * | 8/2000 | Dollesin..............224/509 |
| 6,179,184 | * | 1/2001 | Belinky et al........224/510 |

Signed and Sealed this

Ninth Day of January, 2007

JON W. DUDAS
*Director of the United States Patent and Trademark Office*